(12) United States Patent
Thouvenot et al.

(10) Patent No.: US 10,626,024 B2
(45) Date of Patent: Apr. 21, 2020

(54) OPTIMIZED NOZZLE FOR INJECTING PRESSURIZED WATER CONTAINING A DISSOLVED GAS

(71) Applicant: Veolia Water Solutions & Technologies Support, Saint-Maurice (FR)

(72) Inventors: Thomas Thouvenot, Maisons Laffitte (FR); Nathalie Vigneron-Larosa, Paris (FR); Nicolas Roux, Levallois-Perret (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 319 days.

(21) Appl. No.: 15/537,918

(22) PCT Filed: Dec. 23, 2015

(86) PCT No.: PCT/EP2015/081221
§ 371 (c)(1),
(2) Date: Jun. 20, 2017

(87) PCT Pub. No.: WO2016/102701
PCT Pub. Date: Jun. 30, 2016

(65) Prior Publication Data
US 2017/0349453 A1    Dec. 7, 2017

(30) Foreign Application Priority Data

Dec. 24, 2014   (FR) ..................................... 14 63342

(51) Int. Cl.
*C02F 1/24*       (2006.01)
*B01F 3/04*       (2006.01)
*B05B 1/34*       (2006.01)

(52) U.S. Cl.
CPC ............ *C02F 1/24* (2013.01); *B01F 3/04241* (2013.01); *B05B 1/3415* (2013.01);
(Continued)

(58) Field of Classification Search
CPC ............ B01F 5/0413; B01F 2005/0441; B01F 2005/0017; B01F 5/043; B01F 5/0415;
(Continued)

(56) References Cited

U.S. PATENT DOCUMENTS 3,761,065 A * 9/1973 Rich ..................... B01F 3/0473
261/76
5,156,779 A * 10/1992 McGowan ............ B01F 5/0405
264/3.3
(Continued)

FOREIGN PATENT DOCUMENTS

CN         202224253         5/2012
DE         3733583 A1        4/1989
(Continued)

*Primary Examiner* — Stephen Hobson
(74) *Attorney, Agent, or Firm* — Coats & Bennett PLLC

(57) ABSTRACT

The present invention concerns a nozzle for injecting pressurized water containing a dissolved gas, said nozzle comprising:
  a cylindrical intake chamber (20) for said water;
  a cylindrical expansion chamber (30) comprising a part (301) communicating with said intake chamber (20) by an orifice (401) and an outlet;
  a diffusion chamber (60) of truncated conical section communicating with the outlet of said expansion chamber (30) and widening out from said expansion chamber;
said nozzle comprising means for putting the stream of water that flows out of said expansion chamber (30) into rotation.

18 Claims, 3 Drawing Sheets

(52) U.S. Cl.
CPC .............. *B01F 2003/04304* (2013.01); *B01F 2215/0052* (2013.01); *B01F 2215/0422* (2013.01); *B01F 2215/0431* (2013.01); *C02F 2201/003* (2013.01); *C02F 2301/026* (2013.01)

(58) Field of Classification Search
CPC  C02F 11/14; C02F 1/54; C02F 1/5236; C02F 11/127; C02F 1/34; C02F 1/56; C02F 1/5245; C02F 9/00
See application file for complete search history.

(56) References Cited

U.S. PATENT DOCUMENTS

| | | | | |
|---|---|---|---|---|
| 5,302,660 | A * | 4/1994 | Klinksiek | B01F 5/0415 422/131 |
| 7,651,620 | B2 * | 1/2010 | Vion | B03D 1/242 210/703 |
| 8,033,714 | B2 * | 10/2011 | Nishioka | B01D 53/8631 137/888 |
| 8,496,189 | B2 * | 7/2013 | Lomond | B01F 3/12 239/344 |
| 8,845,178 | B2 * | 9/2014 | Hanada | B01F 3/0865 137/888 |
| 9,144,774 | B2 * | 9/2015 | Livshits | B01F 3/04446 |
| 2009/0073800 | A1 * | 3/2009 | Tarmann | B01F 5/0451 366/153.1 |
| 2010/0103768 | A1 * | 4/2010 | Gordon | B01F 5/0604 366/165.4 |
| 2012/0193294 | A1 | 8/2012 | Amato et al. | |
| 2012/0218852 | A1 * | 8/2012 | Becker | B03D 1/028 366/101 |
| 2014/0010040 | A1 * | 1/2014 | Hata | B01F 3/04503 366/163.2 |
| 2014/0196795 | A1 * | 7/2014 | Dunning | F04F 5/44 137/15.08 |
| 2015/0352503 | A1 * | 12/2015 | Lai | B01F 3/04106 261/121.1 |
| 2016/0074819 | A1 * | 3/2016 | Boticki | F16K 31/404 366/152.2 |
| 2016/0271573 | A1 * | 9/2016 | Singh | B01F 5/048 |
| 2017/0145458 | A1 * | 5/2017 | Gordon | C12P 19/14 |

FOREIGN PATENT DOCUMENTS

| | | |
|---|---|---|
| JP | 55008850 A | 1/1980 |
| JP | 07145585 A | 6/1995 |
| JP | 2007509734 | 4/2007 |
| JP | 2011-206689 A | 10/2011 |
| JP | 2013-237008 A | 11/2013 |
| RU | 2465066 C1 | 10/2012 |
| WO | 2014192896 A1 | 12/2014 |

* cited by examiner

OPTIMIZED NOZZLE FOR INJECTING PRESSURIZED WATER CONTAINING A DISSOLVED GAS

This application is a U.S. National Stage Application of PCT Application No. PCT/EP2015/081221, with an international filing date of 23 Dec. 2015. Applicant claims priority based on French Patent No. 1463342 filed 24 Dec. 2014. The subject matter of these applications is incorporated herein.

1. FIELD OF THE INVENTION

The field of the invention is that of methods and devices for treating liquid effluents by flotation.

2. PRIOR ART

Many methods for treating liquid effluents include a flotation step, generally following steps of coagulation and flocculation.

Flotation is a technique that is aimed at separating the particles in suspension in a liquid effluent.

To this end, pressurized water containing a dissolved gas such as air is injected through nozzles 1 at the base of the flotation zone 2 of a flotation reactor within which the effluent to be treated is conveyed via an inlet pipe 3. Under the effect of expansion of the gas dissolved in this water, microbubbles of gas get formed in the effluent to be treated. These microbubbles, in rising to the surface of the effluent to be treated, cling to the particles in suspension, which essentially take the form of flocs, and carry them along. These particles to which microbubbles are attached are then called floc-bubble agglomerates. The mixture of effluent and agglomerates passes from the flotation zone 2 to the separation zone 4 of the reactor. These two zones are separated from each other by a vertical wall 7. The particles in suspension are thus separated in the separation zone 4. The treated effluent gets discharged at the lower part of the separation zone via 4 a pipe 5 planned for this purpose. The particles separated from the effluent for their part are discharged at the upper part of the reactor via a chute 6 provided for this purpose.

In order to inject pressurized water containing dissolved gas into the effluent to be treated, injection nozzles are used. They are distributed uniformly in the lower part of the flotation zone of the flotation reactor.

As shown in FIG. 2, which illustrates an injection nozzle developed by the Applicant, such an injection nozzle comprises:
- a cylindrical intake chamber 10 for pressurized water comprising an inlet 100 and an outlet 101;
- a cylindrical expansion chamber 11 comprising an inlet 110 communicating with the intake chamber 10 by an orifice 12;
- a diffusion chamber 13 the section of which comprises one or more truncated cones of revolution extending in the prolongation of one another and widening out from the expansion chamber towards the outlet of the nozzle and communicating with the expansion chamber 11 by means of apertures 14 distributed uniformly around the axis of revolution of the nozzle.

Industrialists in the liquid effluent treatment sector have not ceased to increase the productivity of their treatment plants. To this end, they seek to increase the speed of passage of the effluents to be treated within the treatment plant to reach effluent front speeds of over 30 to 40 m/h in the zone of separation of the flotation reactor. More specifically, the front speed of the effluent is a speed of the effluent in the zone situated above the vertical wall 7 which separates the flotation zone 2 from the separation zone 4.

The maximum speed of passage permissible for an effluent to be treated in a flotation reactor depends on the flotation capacity of the particles in suspension to be separated and of the microbubbles that get attached to them on top, i.e. of the agglomerates.

In order to promote the clinging of gas microbubbles to the particles in suspension, those skilled in the art conventionally seek to produce the smallest possible microbubbles, i.e. microbubbles having an equivalent diameter of less than 100 micrometers.

This approach however tends to reduce the floatability of the agglomerates because of a maximum number of microbubbles attachable per floc and hence to reduce the speed of treatment. This is incompatible with the goals of industrialists which are to increase the speed of treatment.

From the opposite point of view, the use of large microbubbles, hence with an equivalent diameter greater than 200 micrometers, makes it possible to increase the floatability of the agglomerates. This could lead to an increase in the speed of treatment. However, it induces a risk of breakage of the flocs of matter to be eliminated and also induces high major consumption.

Stokes law has made it possible to relate the speed of treatment of the effluent within a flotation reactor to the size of the microbubbles, as is illustrated by the curve of FIG. 3. As can be seen in this curve, the optimum diameter of the microbubbles needed to guarantee efficient flotation without any risk of carrying along microbubbles with the treated effluent or of breakage of the flocs, for a speed of passage of the effluent to be treated into the reactor of about 30 m/h, is in the range of 140 micrometers. As can also be seen in this curve, the optimum diameter of the microbubbles to ensure efficient flotation without any risk of carrying along microbubbles with the treated effluent or of breakage of the flocs for a speed of passage of the effluent to be treated into the reactor around 50 m/h is in the range of 190 micrometers.

Thus, to ensure efficient and speedy flotation, the size of the microbubbles should be between 100 and 200 micrometers.

However, there is no injection nozzle that can be used to maximize the production of microbubbles that are neither too small or too big, i.e. making it possible to increase the proportion of microbubbles produced with a diameter of 100 to 200 micrometers, thus consequently making it possible to carry out speedy and efficacious flotation.

3. GOALS OF THE INVENTION

The invention is aimed especially at providing an efficient solution to at least some of these difficult problems.

In particular, according to at least one embodiment, it is one goal of the invention to provide a technique that optimizes treatment by flotation.

In particular, the invention is aimed, according to at least one embodiment, at providing a technique of this kind that increases the speed of treatment by flotation while at the same time preventing gas microbubbles from being carried along in the treated effluent.

It is another goal of the invention, according to at least one embodiment, to provide a technique of this kind that improves the production of microbubbles having a diameter of 100 to 200 micrometers.

It is another goal of the invention, in at least one embodiment, to provide a technique of this kind that is simple and/or efficient and/or reliable and/or economical.

4. PRESENTATION OF THE INVENTION

To this end, the invention proposes a nozzle for injecting pressurized water containing a dissolved gas, said nozzle comprising:
- a cylindrical chamber for the intake of said water;
- a cylindrical expansion chamber comprising an inlet communicating with said intake chamber by an orifice and an outlet;
- a diffusion chamber of truncated conical section communicating with the outlet of said expansion chamber and widening out from said expansion chamber said nozzle comprising means for putting the stream of water that flows out of said expansion chamber into rotation.

The stream flowing out of the expansion chamber is thus put into rotation about the axis of the expansion chamber, i.e. about the axis of the nozzle. This dissipates its energy and improves the subsequent clinging of the microbubbles with the flocs while preventing an injection of excessively turbulent whitewater into the stream to be treated and therefore a breaking of the flocs. This also redirects and disperses the stream within the diffusion chamber or chambers for better contact with the diffusion wall and a continuation of the dissipation of energy.

Thus, the formation of microbubbles of a diameter of 100 to 200 micrometers, is favored.

In one particular embodiment, said outlet of said expansion chamber comprises at least two apertures distributed uniformly about the axis of revolution of said expansion chamber, each of said apertures extending along an axis:
- situated in a plane parallel to the axis of revolution of said expansion chamber, and
- tilted relative to the axis of revolution of said expansion chamber, the axes of said apertures being tilted in a same sense so as to put the stream of water flowing out of said expansion chamber into rotation along said sense.

This implementation contributes to maximizing the formation of microbubbles, the diameter of which ranges from 100 to 200 micrometers, in a simple and efficient way.

According to one particular embodiment, the angle γ of said truncated conical diffusion chamber relative to its axis of revolution and the angle α of tilt of said apertures are chosen to maintain a bubble size essentially ranging from 100 to 200 micrometers at the exit from said diffusion chamber.

The choice of these values of angles also contributes to simply and efficiently maximizing the formation of microbubbles having a diameter of 100 to 200 micrometers.

According to one particular characteristic of the invention, said nozzle comprises a needle placed in said expansion chamber facing said orifice and pointing in its direction.

Thus, according to this aspect, the invention consists in placing a needle in the axis oriented towards the orifice connecting the intake chamber and the expansion chamber of a nozzle for injecting pressurized water containing a dissolved gas.

The presence of the needle makes it possible to:
- homogeneously distribute pressurized water within the expansion chamber,
- increase the nucleation surface and thus improve the homogeneity of the size of the microbubbles.

According to one particular characteristic of the invention, a nozzle can comprise means for sustaining the putting of said stream into rotation, said means for sustaining being housed in said diffusion chamber.

This enables the stream flowing in the nozzle to keep its rotational motion. This improves the subsequent clinging of the microbubbles to the flocs while continuing to dissipate the energy of the injected stream: the stream is stabilized in limiting the turbulence.

In this case, said means for sustaining could include at least two blades extending from the axis of revolution of said diffusion chamber up to its peripheral contour and being distributed uniformly about this axis, each of said blades extending in a plane passing through an axis perpendicular to the axis of revolution of said diffusion chamber and tilted in said sense.

According to one particular characteristic of the invention, a nozzle can comprise at least one truncated conical intermediate diffusion chamber placed between said expansion chamber and said diffusion chamber, and having a section that widens in the direction of the diffusion chamber.

The implementation of an intermediate diffusion chamber prevents whirlpool-like azimuthal flows also called recirculating flows.

There is a risk that a cone with an excessively large aperture will not contain this stream and will induce a recirculating flow at the walls because a fluid injected with a high speed differential into a medium at rest (in comparison with the injected fluid) will go into a whirling motion. This intermediate diffusion chamber therefore guides the fluid and prevents these whirlpool-like "recirculating flows" which are substantially present in the event of injection known as annular injection (which is the case here since the stream is distributed about an axis through the apertures).

According to one particular characteristic of the invention, a nozzle can comprise lateral water inlets situated between said diffusion chamber and said intermediate diffusion chamber.

The effluent to be treated contains particles in suspension that constitute, within the nozzle, nucleation sites which are the seat of the formation of microbubbles. Thus, the formation of air microbubbles is increased.

In this case, the inlet diameter of said diffusion chamber could be greater than the outlet diameter of said intermediate diffusion chamber, the inlet of said diffusion chamber overlapping the outlet of said intermediate diffusion chamber to create spaces between said chambers, said spaces constituting said lateral water inlets.

According to one particular characteristic of the invention, the angle γ of said truncated conical diffusion chamber relative to its axis of revolution and the angle β of said intermediate diffusion chamber relative to its axis of revolution are identical.

According to one particular characteristic of the invention, the angle γ of said truncated conical diffusion chamber relative to its axis of revolution is greater than the angle β of said intermediate diffusion chamber relative to its axis of revolution.

According to one particular characteristic of the invention, the value of the angles γ and β ranges from 0 to 30°.

According to one particular characteristic of the invention, the angle α of tilt of said apertures (901) ranges from 20° to 60°.

According to one particular characteristic of the invention, the angle φ of tilt of said blades (70) ranges from 20° to 60°.

5. LIST OF FIGURES

Other features and advantages of the invention shall appear from the following description of particular embodiments, given by way of simple illustratory and non-exhaustive examples, and from the appended drawings, of which:

6. DESCRIPTION OF PARTICULAR EMBODIMENTS

6.1. Architecture

Figure 1:
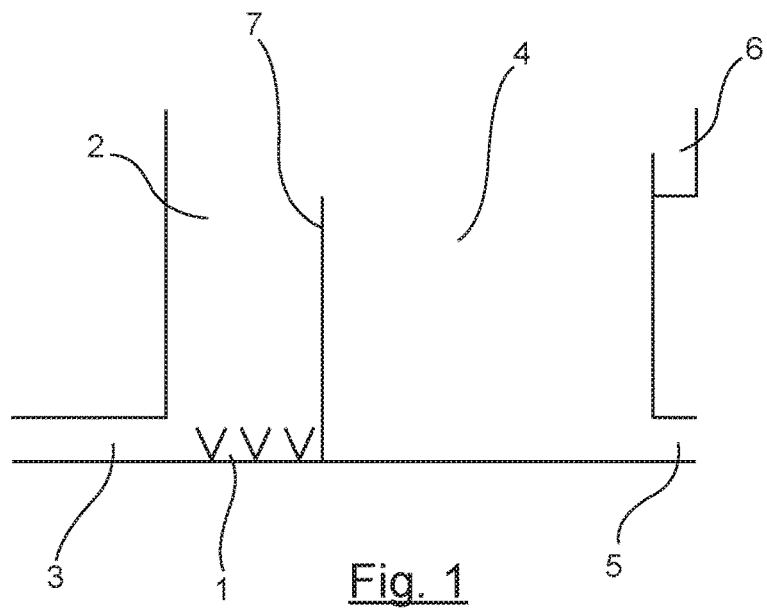
FIG. 1 illustrates the diagram of a flotation reactor.
Figure 2:
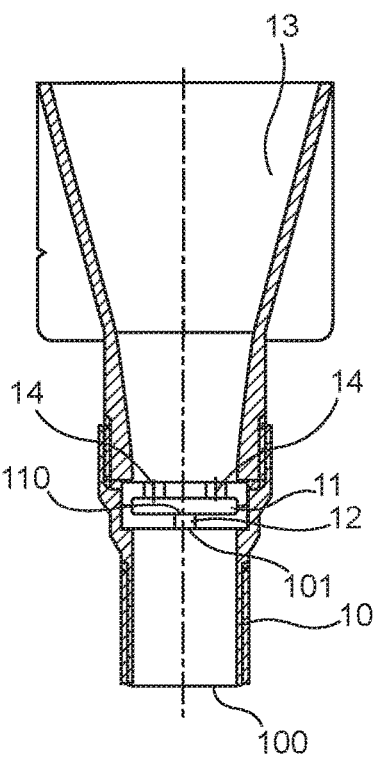
FIG. 2 illustrates a view in longitudinal section of an injection nozzle according to the prior art.
Figure 3:
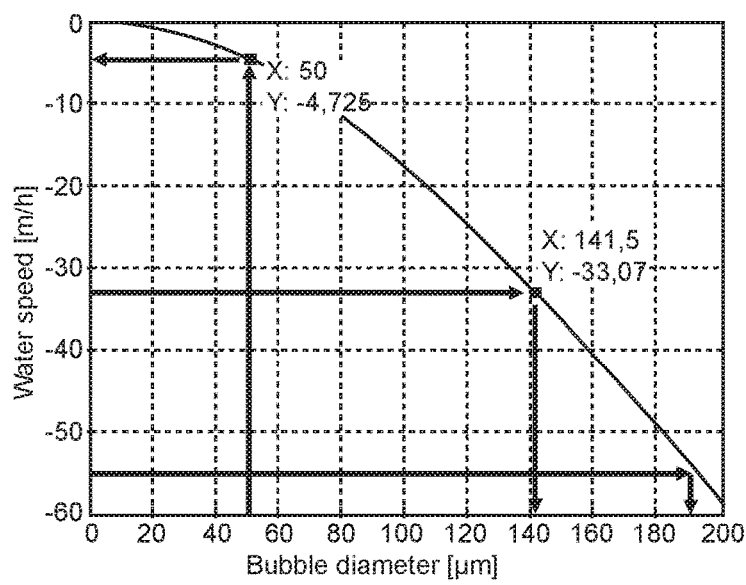
FIG. 3 illustrates the link between the diameter of the microbubbles and the speed of passage of an effluent to be treated into a flotation reactor according to the Stokes's Law.
Figure 4:
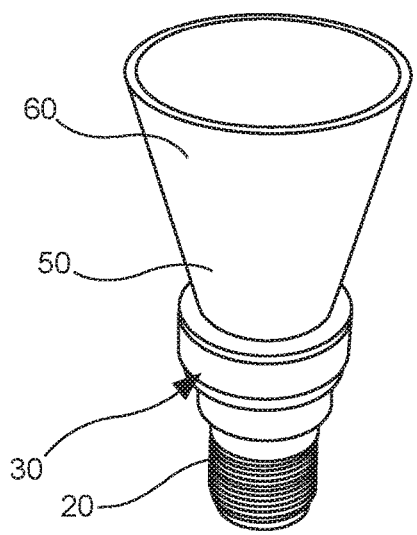
FIG. 4 illustrates a view in perspective of a nozzle according to a first embodiment of the invention.
Figure 6:
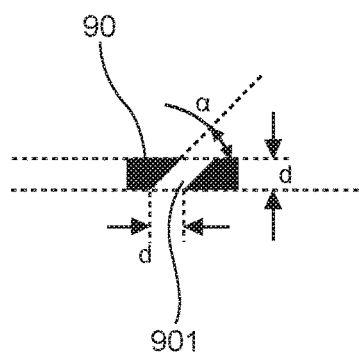
FIGS. 6 and 7 illustrate two details of FIG. 5.
Figure 7:
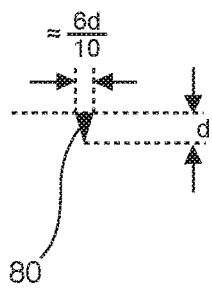
Figure 5:
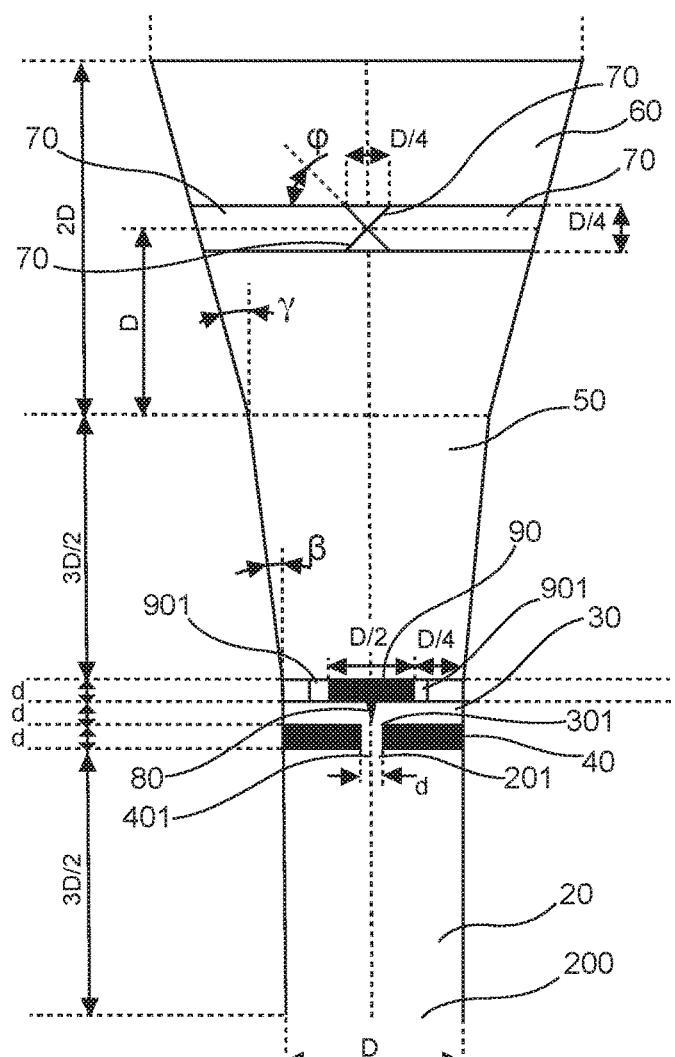
FIG. 5 illustrates a view in longitudinal section of the nozzle illustrated in FIG. 4.
Figure 8:
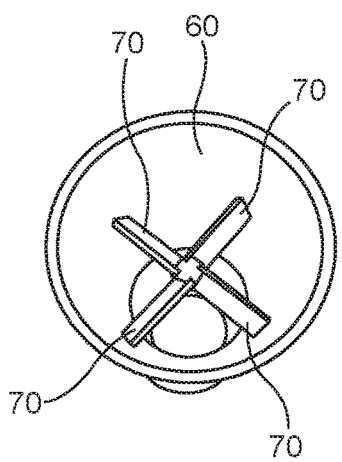
FIG. 8 illustrates a top view of the nozzle of FIGS. 4 and 5.

The bottom, the base or the inlet of the nozzle designate the end by which pressurized water enters the nozzle. The top or the outlet of the nozzle designate the end by which expanded pressurized water comes out of the nozzle.

6.1.1. First Type

Referring to FIGS. 4 to 8, we present a first embodiment of an injection nozzle according to the invention.

Thus, as shown in these figures, such a nozzle comprises an intake chamber 20 through which pressurized water containing dissolved gas can be introduced into the nozzle. This intake chamber 20 comprises an inlet 200 and an outlet 201. It has a cylindrical section of revolution. In this embodiment, the height of the intake chamber 20 is equal to 3/2 times its diameter D.

The diameter D preferably ranges from 10 to 50 mm.

The diameter d of the orifice 401 preferably ranges from 2 to 6 mm.

The nozzle also comprises an expansion chamber 30.

The expansion chamber 30 extends in the prolongation of the intake chamber 20 and in the same axis. It has a cylindrical section of revolution. It is separated from the intake chamber 20 by a wall 40. It comprises an inlet 301 which communicates with the outlet 201 of the intake chamber 20 by means of an orifice 401 made through the wall 40 along the longitudinal axis of the expansion chamber 30. In this embodiment, the thickness of the wall 40 is equal to the diameter d of the orifice 401, the thickness of the expansion chamber 30 is equal to the diameter d of the orifice 401, the diameter of the expansion chamber 30 is equal to that of the intake chamber 20.

The nozzle comprises an intermediate diffusion chamber 50 which extends in the prolongation and in the axis of the expansion chamber 30. In one variant, several intermediate diffusion chambers could be implemented in the prolongation of one another. This diffusion chamber has the shape of a truncated cone. It is separated from the expansion chamber 30 by a wall 90 crossed by apertures 901 which constitute the outlet of the expansion chamber 30 and the inlet of the intermediate diffusion chamber 50. The expansion chamber 30 and the intermediate diffusion chamber 50 thus communicate with each other by means of the apertures 901. In this embodiment, the thickness of the wall 90 is equal to the diameter d of the orifice 401, the distance between the axis of revolution of the intermediate diffusion chamber 50 and the end of each aperture 901 placed towards it is equal to a quarter of the diameter D of the intake chamber 20. In this embodiment again, the apertures 901 have a square section, the side of which is equal to the diameter d of the orifice 401. Each aperture 901 extends along an axis:

situated in a plane parallel to the axis of revolution of the expansion chamber, and tilted relatively to the axis of revolution of the expansion chamber.

The axes of the apertures 901 are tilted in a same sense so as to put into rotation, in this sense, the stream of water flowing out of the expansion chamber as will be explained in greater detail here below.

In this embodiment, the value of the angle $\alpha$ of tilt of the apertures 901 relative to the upper surface of the wall 90 is equal to 45°. The apertures 901 are herein four in number. They are distributed uniformly about the axis of revolution of the expansion chamber 30.

The diameter of the base of the intermediate diffusion chamber 50 is equal to that of the expansion chamber 30. In this embodiment, the angle $\beta$ of the truncated cone relative to its axis of revolution is equal to 7°. This truncated cone widens from the expansion chamber 30 to the outlet of the intermediate diffusion chamber 50. In this embodiment, the height of the intermediate diffusion chamber 50 is equal to 3/2 times the diameter D of the intake chamber 20.

The expansion chamber 30 houses a needle 80. This needle projects out of the surface of the wall 90 and faces and points towards the orifice 401. The needle 30 is therefore a pointed element projecting out of the surface of the wall 90 and pointing in the axis and towards the orifice 401. The height of the needle 80 is equal to the height of the expansion chamber. The diameter of the base of the needle is approximately equal to 6/10 of the diameter of the orifice 401.

The nozzle comprises a diffusion chamber 60 which extends in the prolongation of the intermediate diffusion chamber 50 and in the same axis. It has the shape of a truncated cone of revolution, the angle $\gamma$ of which relative to its axis of revolution, being equal in this embodiment to 15°. This truncated cone widens from the intermediate expansion chamber 50 towards the outlet of the diffusion chamber 60. The diameter of its base is equal to that of the final diameter of the intermediate diffusion chamber 50. In this embodiment, the height of the diffusion chamber 60 is equal to twice the diameter D of the intake chamber 20.

The diffusion chamber 60 houses blades 70 also called paddles. These blades 70 are distributed uniformly about the axis of revolution of the diffusion chamber 60. They each extend from this axis up to the peripheral wall of the diffusion chamber 60. In this embodiment, they are four in number. Each blade 70 extends along a plane passing through an axis perpendicular to the axis of revolution of the diffusion chamber 60 and tilted in the sense of rotation of the stream of water, at exit from the expansion chamber. The angle $\varphi$ of tilt of the blades 70 is in this embodiment equal to 45° relative to the horizontal or a plane perpendicular to the axis of the nozzle.

In this embodiment:
the horizontally projected width of the blades 70 is equal to a quarter of the diameter D of the intake chamber 20;
the vertically projected height of the blades 70 is equal to a quarter of the diameter D of the intake chamber 20;
the height of their longitudinal axis relative to the base of the diffusion chamber 60 is equal to the diameter of the intake chamber 20.

In this embodiment, the diameter D of the intake chamber 20 is equal to 27 mm and the diameter D of the orifice 401 is equal to 3.5 mm.

The ranges of operation of said nozzle are preferably 3 to 10 bars of pressure and 0.3 to 3 m³/h of flowrate.

6.1.2. Second Type

Figure 9:
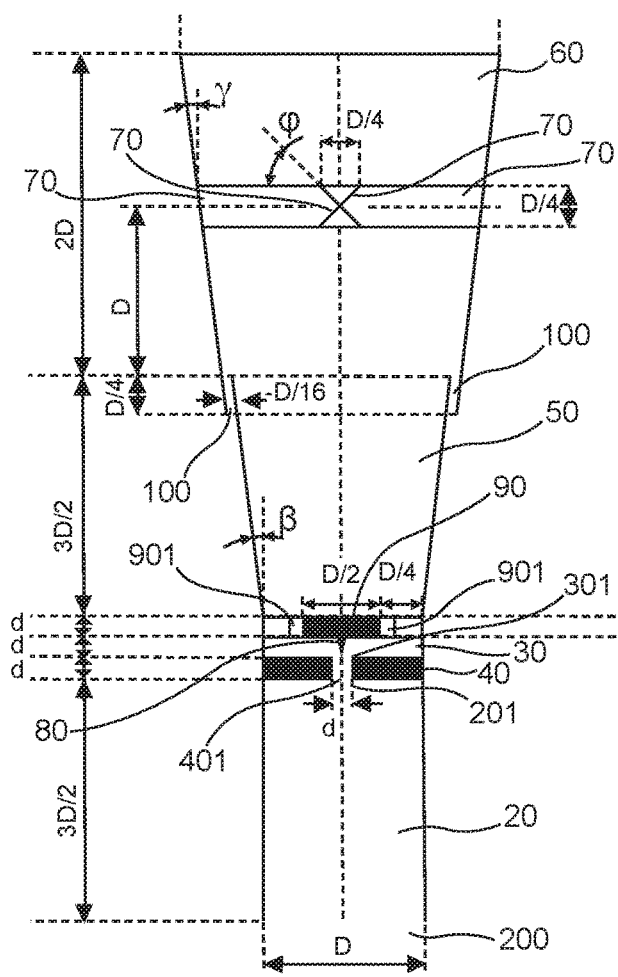
FIG. 9 illustrates a view in longitudinal section of a nozzle according to a second embodiment of the invention.
Figure 10:
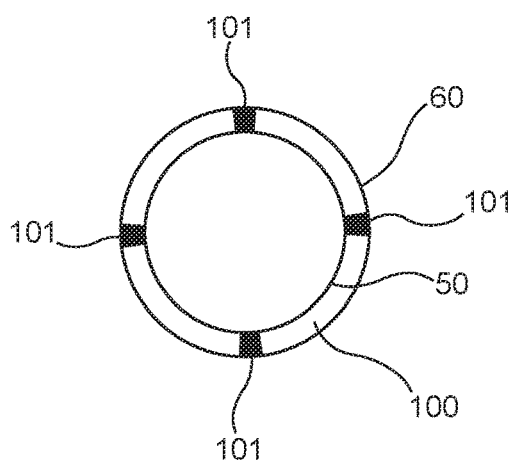
FIG. 10 illustrates a view in cross-section of the nozzle of FIG. 9 according to a plane passing through the lateral water inlets.

Referring to FIGS. 9 and 10, we present a second embodiment of a nozzle according to the invention. Only the differences between the nozzle according to the first embodiment and the nozzle according to this second embodiment are described in detail here.

According to this embodiment, the nozzle comprises lateral water inlets 100 situated between the diffusion chamber 60 and the intermediate diffusion chamber 50.

To this end, the inlet diameter of the diffusion chamber 60 is greater than the outlet diameter of the intermediate diffusion chamber 50 and the base of the diffusion chamber 60 overlaps the outlet of the intermediate diffusion chamber 60 so that they mutually create spaces between them constituting the lateral water inlets 100. A space is thus prepared between the diffusion chamber 60 and the intermediate diffusion chamber 50 to constitute the lateral water inlets 100. Supports 101 are interposed between the diffusion chamber 60 and the intermediate diffusion chamber 50 to mutually connect them at regular intervals.

The height of overlapping of the diffusion chamber 60 and intermediate diffusion chamber 50 in this embodiment is equal to a quarter of the diameter D of the intake chamber 20, while the distance between the walls of the diffusion chamber 60 and the intermediate diffusion chamber 50 in the overlapping zone is equal to one-sixteenth of the diameter D of the intake chamber 20.

In this embodiment, the angles of the truncated cones of the diffusion chamber 60 and intermediate diffusion chamber 50 are identical and equal to 7°.

6.2. Operation 6.2.1. Nozzle of the First Type

Nozzles according to the invention are to be placed at the base of a flotation reactor in order to treat a liquid effluent by flotation.

During such treatment, pressurized water containing dissolved gas such as air is introduced into each nozzle by the intake chamber 20.

The pressurized water then passes through the orifice 401 and penetrates the expansion chamber 30 within which it is subjected to high load loss and expands giving rise to the formation of microbubbles of air. The presence of the needle 80 enables:
the homogeneous distribution of pressurized water within the expansion chamber;
the increasing of the nucleation surface and thus the improvement of the homogeneity of the size of the microbubbles.

The water continues to shift within the nozzle in passing through the apertures 901 to penetrate the interior of the intermediate diffusion chamber 50.

Owing to the tilt of the apertures 901 which form beveled edges, the stream coming out of the expansion chamber is put into rotation. This dissipates its energy and improves the subsequent clinging of the microbubbles to the flocs. This also redirects and disperses the stream between the diffusion chamber and intermediate diffusion chamber.

The stream continues to move in the nozzle, flowing through the intermediate diffusion chambers 50, the implementing of which prevents whirlpool-like azimuthal flows by reattaching the stream to the wall.

The stream then passes into the diffusion chamber 60, the implementation of which slows down the stream in dissipating its energy, while at the same time offering contact with the wall of the nozzle. Dissipating the energy provides for a better clinging between flocs and bubbles at the exit from the nozzle and thus prevents the flocs from getting broken up. The stream flows along the blades 70, the implementing of which makes it possible to preserve a rotational motion. This further improves the subsequent clinging of the microbubbles with the flocs.

A mixture of water and microbubbles also called whitewater then emerges from the nozzle through the end of the diffusion chamber 60.

The use of tilted apertures enables the production of a microbubbles of sizes whose diameter ranges from 100 to 200 micrometers. The apertures should be tilted in such a way that the particles in suspension necessarily meet the upper surface of their contour. The ideal angle of tilt is therefore smaller than 45° but can range from 20° to 60°. The rotation induced by the tilted apertures thus makes it possible to cause the microbubbles and particles to encounter each other less violently than in a turbulent stream and thus makes it possible to create bigger microbubbles.

The needle is not indispensable but homogenizes the production of microbubbles by increasing the numbers of nucleation sites.

We thus prevent the formation of excessively small microbubbles or excessively big microbubbles which do not provide for swift and efficient flotation.

6.2.2. Nozzles of the Second Type

The working of a nozzle according to the second embodiment is identical to that of the first embodiment apart from the fact that, under the effect of the movement of pressurized water within the nozzle, the surrounding effluent to be treated in which the nozzle is immersed is aspirated by low pressure into the nozzle at the lateral water inlets 100.

The effluent to be treated contains suspended particles which constitute, within the nozzle, nucleation sites which are the seat of formation of the microbubbles.

Thus, the formation of air microbubbles is increased.

6.3. Results

Comparative trials were made on the one hand with nozzles according to the prior art and on the other hand with nozzles according to the first embodiment.

During these trials, the diameter of the intake chamber of the nozzles was equal to 27 mm, and the diameter of the orifice was equal to 3.5 mm and the diameter of the needle 80 was equal to 2 mm. The pressure of the pressurized water at its inlet into the intake chamber was equal to 5 bars and its flowrate was equal to 0.74 m³/h.

Figure 11:
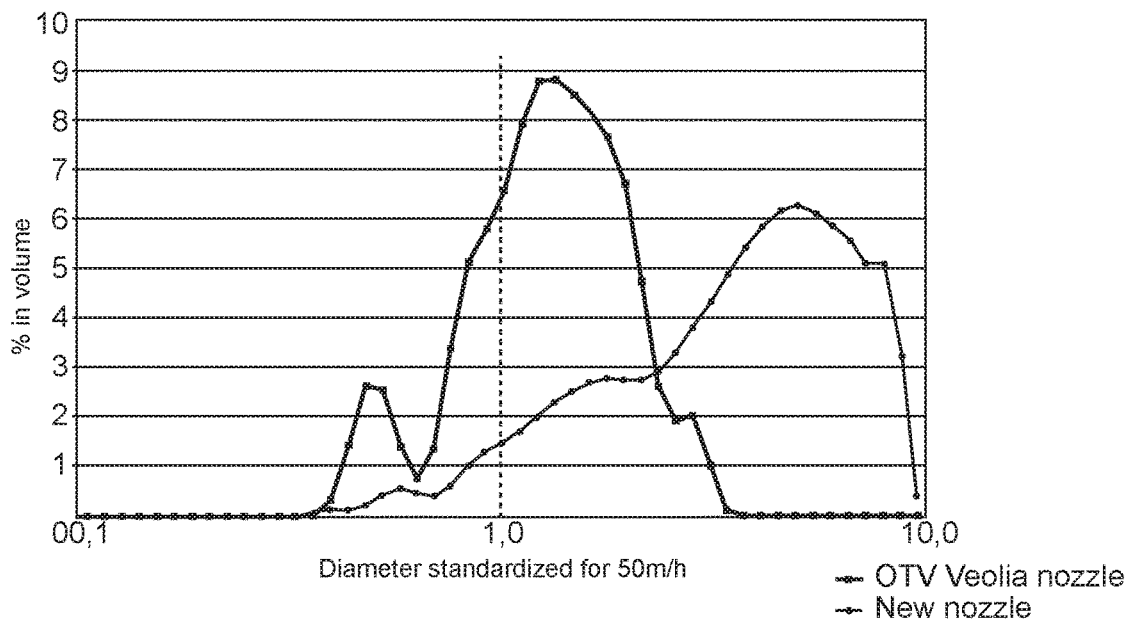
FIG. 11 illustrates curves showing the size of the microbubbles formed by the implementation of a prior-art nozzle and a nozzle according to the invention.

The curve of FIG. 11 illustrating the results obtained shows that the nozzles according to the invention enable the production of a majority of microbubbles with a size great enough to efficiently ensure flotation with a speed of passage of the effluent to be treated into the reactor of over 50 m/h. Indeed, most of the microbubbles formed by the nozzle according to the invention have a size close to that of the optimum size for a speed of 50 m/h computed by Stokes' law; microbubbles formed by nozzles according to the prior art have a part of the population below this threshold and therefore do not have sufficiently floatability to increase the speeds of passage into the flotation structures.

The invention claimed is:

1. A nozzle for injecting pressurized water into a system for treating the water, comprising:
   the system including a flotation zone for receiving the water and a separation zone for separating particles in suspension in the water;
   the nozzle having a central axis and configured to inject pressurized water into the flotation zone which forms microbubbles that rise towards the surface of the water and which cling to the particles in suspension in the water, said nozzle comprising:
   (i) an intake chamber having an inlet and an outlet for receiving pressurized water;
   (ii) an expansion chamber projecting from the intake chamber and configured to receive water from the intake chamber;
   (iii) an intermediate diffusion chamber projecting from the expansion chamber;
   (iv) a diffusion chamber projecting from the intermediate diffusion chamber for receiving the water therefrom and having a wall that flares outwardly with respect to the intermediate diffusion chamber;
   (v) the intermediate diffusion chamber having a wall that flares outwardly with respect to the expansion chamber;
   (vi) a first wall that separates the expansion chamber from the intake chamber, the first wall including at least one orifice for passing the water from the intake chamber to the expansion chamber;
   (vii) a second wall separating the expansion chamber from the intermediate diffusion chamber, the second wall including one or more angled apertures that enable a stream of water to pass from the expansion chamber to the intermediate diffusion chamber;
   (viii) wherein the one or more apertures formed in the second wall are tilted with respect to the central axis of the nozzle and configured to put in rotation the stream of water flowing from the expansion chamber through the one or more angled apertures into the intermediate diffusion chamber; and
   (ix) a series of rotating blades located in the nozzle downstream of the expansion chamber for sustaining the rotation of the stream of water flowing through the diffusion chamber.

2. The nozzle of claim 1 including a needle projecting from a downstream side of the second wall towards the at least one orifice in said first wall.

3. The nozzle of claim 1 wherein there is a series of angled apertures formed in said second wall and wherein the apertures are uniformly distributed about a central axis of the nozzle.

4. The nozzle of claim 1 wherein both the intermediate diffusion chamber and the diffusion chamber assume a truncated conical shape.

5. The nozzle of claim 1 wherein there is provided lateral water inlets about an interface disposed between the intermediate diffusion chamber and the diffusion chamber.

6. The nozzle of claim 1 wherein the flared wall of the diffusion chamber and an angle $\alpha$ of the tilt of said one or more apertures formed in the second wall are configured to maintain a bubble size ranging from 100 to 200 micrometers at an outlet of the diffusion chamber.

7. The nozzle according to claim 1, wherein the angle $\gamma$ of the diffusion chamber relative to the axis of the nozzle and the angle $\alpha$ of tilt of the one or more apertures are configured to maintain a bubble size ranging from 100 to 200 micrometers at the outlet of the diffusion chamber.

8. The nozzle of claim 1 wherein the blades extend in a plane perpendicular to the axis of the nozzle.

9. The nozzle according to claim 1 wherein the inlet diameter of said diffusion chamber is greater than the outlet diameter of said intermediate diffusion chamber, the inlet of said diffusion chamber overlapping the outlet of said intermediate diffusion chamber to create spaces between said chambers, said spaces constituting said lateral water inlets.

10. The nozzle according to claim 1, wherein the angle $\gamma$ of said diffusion chamber relative to the central axis and the angle $\beta$ of said intermediate diffusion chamber relative to the axis are identical.

11. The nozzle according to claim 1, wherein the angle $\gamma$ of said diffusion chamber relative to the central axis is greater than the angle $\beta$ of said intermediate diffusion chamber relative to the axis.

12. The nozzle according to claim 1, wherein the angle $\gamma$ is an angle of said diffusion chamber relative to the central axis and wherein the angle $\beta$ is an angle of said intermediate diffusion chamber relative to the central axis, and wherein the angle $\gamma$ is greater than the angle $\beta$ and wherein the value of the angles $\gamma$ and $\beta$ ranges from 0 to 30°.

13. The nozzle according to claim 1, wherein the angle $\alpha$ of tilt of said one or more apertures ranges from 20° to 60°.

14. The nozzle according to claim 1, wherein the angle $\varphi$ of tilt of said blades ranges from 20° to 60°.

15. A nozzle for injecting pressurized water into a system for treating the water, comprising:
   the system including a flotation zone for receiving the water and a separation zone for separating particles in suspension in the water;
   the nozzle having a central axis and configured to inject pressurized water into the flotation zone which forms microbubbles that rise towards the surface of the water and which cling to the particles in suspension in the water, said nozzle comprising:
   (i) an intake chamber having an inlet and an outlet for receiving pressurized water;
   (ii) an expansion chamber projecting from the intake chamber and configured to receive water from the intake chamber;
   (iii) a diffusion chamber having a flared outer wall and projecting from the expansion chamber;
   (iv) wherein the expansion chamber is defined by a first wall that separates the expansion chamber from the intake chamber and a second wall separating the expansion chamber from the diffusion chamber;
   (v) wherein the first wall includes at least one orifice for passing the water from the intake chamber to the expansion chamber;
   (vi) one or more angled apertures formed in the second wall and configured to direct a stream of water therethrough from the expansion chamber to the diffusion chamber, and further the one or more angled apertures configured to put into rotation the stream of water passing from the expansion chamber to the diffusion chamber such that the stream of water rotates through the diffusion chamber;
   (vii) wherein the one or more angled apertures are tilted with respect to a central axis of the nozzle; and
   (viii) a series of rotating blades located in the nozzle downstream of the expansion chamber for sustaining the rotation of the stream of water passing through the diffusion chamber.

16. The nozzle according to claim 15 wherein the one or more angled apertures form an angle α of tilt and wherein the angle α of tilt ranges from 20° to 60°.

17. The nozzle according to claim 16 wherein there is an angled φ of tilt of said blades and wherein the angle φ ranges from 20° to 60°.

18. The nozzle according to claim 16 further including:
a needle projecting from said second wall towards an orifice formed in the first wall; and
wherein the blades extend from an axis of rotation of the diffusion chamber up to a peripheral contour and wherein the blades are distributed uniformly about the axis and wherein each of the blades extends through a plane that is perpendicular to the axis of the diffusion chamber.

\* \* \* \* \*

UNITED STATES PATENT AND TRADEMARK OFFICE
CERTIFICATE OF CORRECTION

PATENT NO. : 10,626,024 B2  
APPLICATION NO. : 15/537918  
DATED : April 21, 2020  
INVENTOR(S) : Thomas Thouvenot, Nathalie Vigneron-Larosa and Nicolas Roux Page 1 of 1

It is certified that error appears in the above-identified patent and that said Letters Patent is hereby corrected as shown below:

In the Claims

Column 10, Lines 5-10 Claim 9 should read as follows:
-- 9. The nozzle according to claim 5 wherein the inlet diameter of said diffusion chamber is greater than the outlet diameter of said intermediate diffusion chamber, the inlet of said diffusion chamber overlapping the outlet of said intermediate diffusion chamber to create spaces between said chambers, said spaces constituting said lateral water inlets. --

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*